(12) United States Patent
Schoeffel et al.

(10) Patent No.: US 6,298,719 B1
(45) Date of Patent: Oct. 9, 2001

(54) MEASURING THE ANGULAR DISTRIBUTION OF A LIQUID SPRAY PRODUCED BY A FUEL INJECTION VALVE

(75) Inventors: Eberhard Schoeffel, Bamberg; Josef Seidel, Breitenguessbach, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,531

(22) PCT Filed: Apr. 17, 1999

(86) PCT No.: PCT/DE99/01154

§ 371 Date: May 30, 2000

§ 102(e) Date: May 30, 2000

(87) PCT Pub. No.: WO00/19168

PCT Pub. Date: Apr. 6, 2000

(30) Foreign Application Priority Data

Sep. 29, 1998 (DE) .............................................. 198 44 602

(51) Int. Cl.[7] ................................................. G01M 15/00
(52) U.S. Cl. .......................................................... 73/119 A
(58) Field of Search .................... 73/855.8, 866, 73/119 A (56) References Cited

U.S. PATENT DOCUMENTS

| 3,459,049 | 8/1969 | Kamps . | |
|---|---|---|---|
| 3,678,743 | * 7/1972 | Maresca et al. | 73/119 A |
| 4,873,103 | * 10/1989 | Cordera | 73/863.41 |
| 5,753,806 | 5/1998 | Ryan et al. . | |

FOREIGN PATENT DOCUMENTS

| 844230 | * 7/1949 | (DE) | 73/119 A |
|---|---|---|---|
| 30 45 401 | 7/1982 | (DE) . | |
| 37 22 059 | 8/1988 | (DE) . | |
| 41 35 580 | 5/1993 | (DE) . | |
| 195 16 923 | 11/1996 | (DE) . | |
| 0196969 | * 7/1949 | (JP) | 73/119 A |
| 59 196969 | 11/1984 | (JP) . | |
| 02 130260 | 5/1990 | (JP) . | |
| 03 186768 | 8/1991 | (JP) . | |

OTHER PUBLICATIONS

P. Reimers et al., "Forschungsbericht 101 Bundesanstalt für Materialprüfung (BAM) Berlin Röntgen—und Gammastrahlen Computer–Tomographie," Feb. 1, 1984, Wirtschaftsverlang NW, Bremerhaven, pp. 2–3.

* cited by examiner

Primary Examiner—Robert Raevis
(74) Attorney, Agent, or Firm—Kenyon & Kenyon

(57) ABSTRACT

A method and a device for measuring the angular distribution of a liquid jet ejected from a spray element (5), particularly of a fuel jet ejected from a fuel injector, is proposed. Partial spray quantities are detected by catch containers at a plurality of measuring coordinates arranged in a spatially or planarly distributed manner. The catch containers each contain a plurality of measuring coordinates, and the measurement is carried out in a multiply repeated manner using catch containers, which are rotated about an axis of rotation with different angles of rotation.

13 Claims, 5 Drawing Sheets

MEASURING THE ANGULAR DISTRIBUTION OF A LIQUID SPRAY PRODUCED BY A FUEL INJECTION VALVE

FIELD OF THE INVENTION

The present invention relates to a method and a device for measuring the angular distribution of a liquid jet ejected from a spray element, particularly of a fuel jet ejected from a fuel injector.

BACKGROUND INFORMATION

Till now, for measuring the angular distribution of a fuel jet ejected from a fuel injector, the fuel injector was usually arranged above a two-dimensional field of catch containers that are each allocated to only one measuring coordinate and detect a partial spray quantity in a predetermined collecting area around the measuring coordinate. The catch containers are provided, for example, with a graduation, which is read off manually, or each of the catch containers is connected to a separate sensor, which electronically measures the partial spray quantity collected by the catch container. On the side facing the fuel injector, the catch containers are provided with a funnel-shaped enlargement having a, for example, square boundary so that the catch containers can be abuttingly arranged side by side in a matrix-like manner. The measurement of ejected fuel quantities by accumulation in an inspection glass is described, for example, in the introductory description of German Patent No. 195 16 923.

The above-described measuring device and the appertaining measuring method have the disadvantage that a separate catch container having a separate sensor has to be provided for each measuring coordinate. If the intention is to provide a resolution in an equidistant grid of 15 measuring coordinates in the two plane coordinate directions, then the measurement at a total of 225 measuring coordinates is required. This requires 255 catch containers having 225 separate sensors. In this context, it must be considered that the sensors must be calibrated among themselves to make an objective and accurate measurement possible. This requires considerable outlay and places limits on an improved resolution of the measurement.

It is also disadvantageous for the catch containers to be arranged in a plane collecting surface. When working with relatively large spray angles, the lateral offset of the catch containers with respect to the vertical spray direction is relatively large. This relatively large lateral offset limits the measurement of relatively large spray angles. Because of the long spray paths in the case of large spray angles, the measuring results are corrupted, for example, by gravitation and a deceleration of the spray jet by the ambient air. Therefore, the measurement of the angular distribution of the fuel jet in the range of large spray angles using the conventional device and the conventional method is unsatisfactory and inaccurate.

SUMMARY OF THE INVENTION

The method and device according to the present invention have the advantage over conventional methods and devices that the number of catch containers and sensors used is considerably lower than used with the method and the device used heretofore. Moreover, a considerably higher resolution of the measured angular distribution can be attained than with the method and the device used heretofore.

A calibration of the sensors can be dispensed with if, in addition to the required repetition of the measurement for compensating for the fact that a catch container is allocated a plurality of measuring coordinates, the measurement is multiply repeated as many times as sensors are present. In the process, each sensor is allocated a weighting factor, which can be determined on the basis of the redundancy of these additional measurements. If the angular distribution is normalized and the absolute spray quantity is not intended to be ascertained, then one measurement can be dispensed with. Since the sensors are not required to be calibrated, the measurement is simplified considerably and the measuring accuracy is markedly increased.

The catch containers are designed, for example, in a strip-shaped manner, and each include an equal number of measuring coordinates. The individual, strip-shaped catch containers arranged side by side can then be separated from each other by dividing walls, which, for example, have cutouts whose edges lie on a common spherical surface. In this manner, the angular distribution can be measured with high accuracy in a range of large spray angles, as well, which is not possible using the conventional plane measuring device. The partial spray quantities collected by the catch containers can be advantageously measured by a capacitive level measurement. The distances between the dividing walls are adapted, for example, to the partial spray quantities to be expected, the distances between the dividing walls being greater where only low partial spray quantities are attained, for example, in the case of catch containers outwardly arranged.

DETAILED DESCRIPTION

Figure 1:
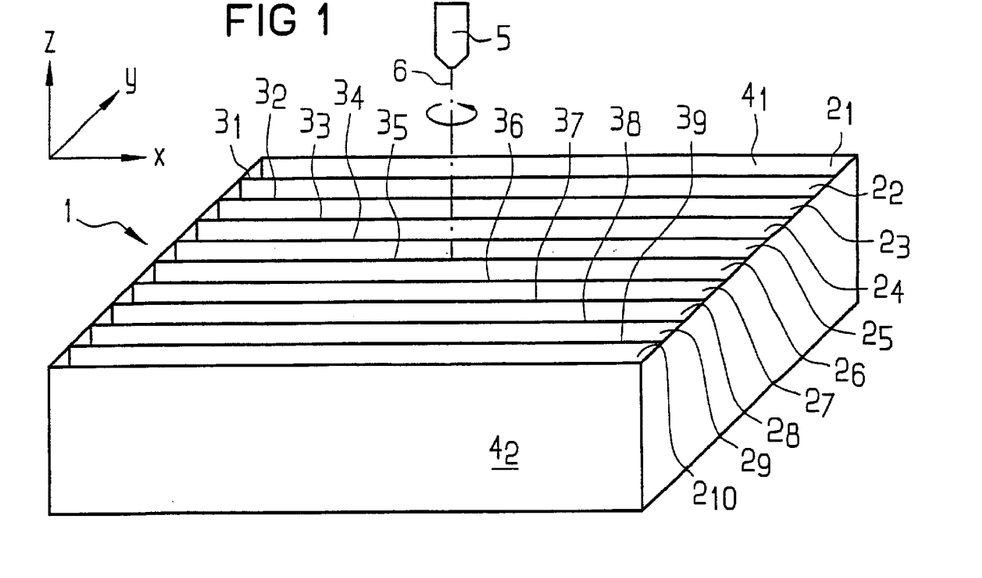
FIG. 1 shows a schematic representation of a first exemplary embodiment of a measuring device according to the present invention.

FIG. 1 shows a first exemplary embodiment of the measuring device 1 according to the present invention. Measuring device 1 of this exemplary embodiment has a relatively simple design and serves mainly for explaining the basic measuring principle.

A plurality of catch containers $2_1$ through $2_{10}$ are provided that have a strip-shaped design and extend along the x-axis with their longitudinal extension. In the exemplary embodiment, ten catch containers $2_1$ through $2_{10}$ of that kind are arranged, one adjoining the other, in the y-direction, and separated from each other by dividing walls $3_1$ through $3_9$. Outer catch containers $2_1$ and $2_{10}$ have an outer wall $4_1$ and $4_2$, respectively. A spray element 5, which is shown only schematically, for example, a fuel injector, is located in the z-direction above the measuring device 1 according to the present invention. In the shown exemplary embodiment, measuring device 1 has a square surface, and spray element 5 is located above the intersection of the diagonals of the square surface. Basically, measuring device 1 according to the present invention can have a, for example, rectangular surface having sides of different length, or a round surface. According to the present invention, measuring device 1 is arranged around an axis of rotation 6 which, in the exemplary embodiment, extends parallel to the z-direction and, for example, coincides with a longitudinal axis of spray element 5. Measuring device 1 is used for measuring the angular distribution of a liquid jet ejected from a spray element 5, particularly of a fuel jet ejected from a fuel injector. In the exemplary embodiment, the main spray direction of spray element 5 coincides with axis of rotation 6.

Figure 2:
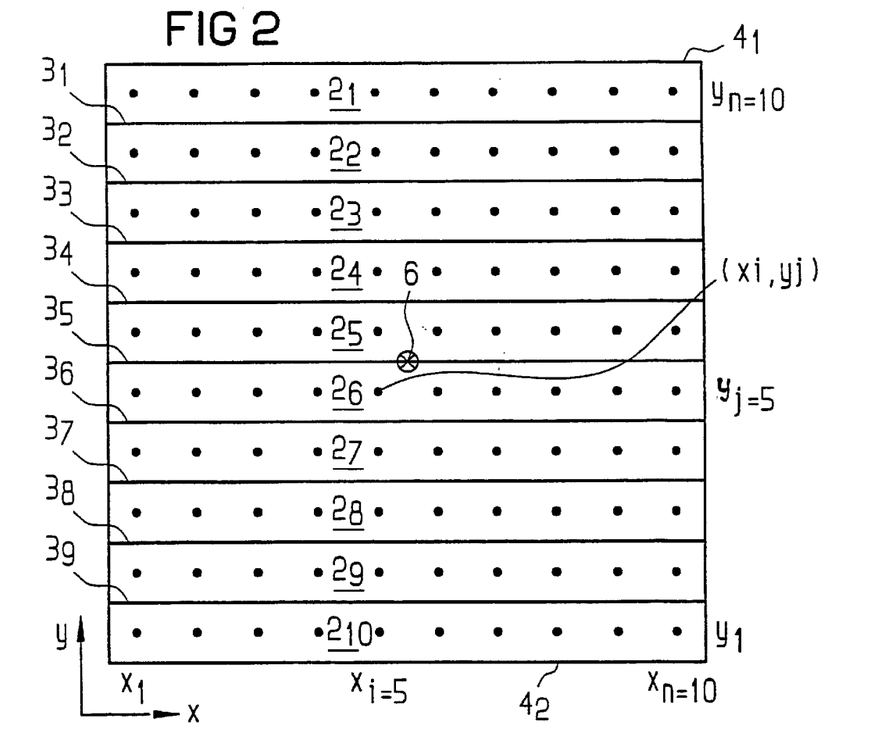
FIG. 2 shows a top view of the measuring device shown in FIG. 1, showing an arrangement of measuring coordinates.

FIG. 2 shows a top view of measuring device 1 shown in FIG. 1, catch containers $2_1$ through $2_{10}$, as well as dividing walls $3_1$ through $3_9$, and outer walls $4_1$ and $4_2$ being visible from above.

At the surface of measuring device 1, measuring coordinates $(x_i, y_j)$ i=1 ... n (n=10), j=1 ... n (n=10) are distributed equidistantly in a grid-like manner in a Cartesian coordinate system. In this context, the ten measuring coordinates $(x_1, y_j)$ ... $(x_{10}, y_j)$ altogether are located in the $j^{th}$ catch container. In the exemplary embodiment shown, a total of 100 measuring coordinates are provided. Unlike with the related art, each catch container $2_1$ through $2_{10}$ contains not only one but a plurality of, in the exemplary embodiment 10, measuring coordinates. The exemplary embodiment, therefore, does not require one catch container for each measuring coordinate, i.e., a total of 100 catch containers, but only 10 catch containers $2_1$ through $2_{10}$. Since, in addition, each catch container $2_1$ through $2_{10}$ is allocated only one sensor for detecting the partial spray quantity collected by the allocated catch container $2_1$ through $2_{10}$, a great number of sensors is dispensed with as compared to the number needed for the conventional measuring device. While, in the conventional measuring device, a separate sensor is required for each measuring coordinate, i.e., a total of 100 catch containers, only a total of 10 sensors are needed in the exemplary embodiment shown in FIGS. 1 and 2.

The method according to the present invention is carried out with the following process steps:

Initially, a first measurement is carried out, spray element 5 ejecting a liquid jet during a preselected time interval, the intention being for the angular distribution of the liquid jet to be measured. In this measurement, for each measuring container $2_1$ ... $2_{10}$, the sum $A_j$ of partial spray quantities $A(x_i, y_j)$ at measuring coordinates $(x_i, y_j)$ contained by the respective catch container $2_1$ ... $2_{10}$ is ascertained according to the following equation:

$$A_j = \sum_{i=1}^{n} A(x_i, y_j) \, j = 1 \ldots n \qquad (1)$$

In this context, $A_j$ represents the partial spray quantities detected by the sensor of the respective catch container $2_1$ ... $2_{10}$ during the individual measurement, and $A(x_i, y_j)$ represents the partial spray quantity at the location of measuring coordinate $(x_i, y_j)$. In the process, a number of summed spray quantities $A_j$ corresponding to the number of existing catch containers $2_1$ ... $2_{10}$ is obtained. In the exemplary embodiment shown, it applies that n=10.

Then, measuring device 1 is rotated about axis of rotation 6 by a predefined angle of rotation. Now, the partial spray quantities of the liquid jet ejected from spray element 5 each impinge in different catch containers $2_1$ through $2_{10}$. In this repeated measurement as well, the summed spray quantity $A_j$ is ascertained for each of the catch containers $2_1$ through $2_{10}$ according to equation (1). In this context, however, the coordinate system of rotated measuring coordinates $(x'_i, y'_j)$ is transformed into unrotated coordinate system $(x_i, y_j)$ so that all measurements can subsequently be evaluated in a uniform coordinate system.

The measurement is subsequently repeated further times, in each case with different angles of rotation of measuring device 1 or of catch containers $2_1$ through $2_{10}$. For that purpose, measuring device 1 is in each case rotated about axis of rotation 6 between two measurements. For the angle of rotation between two measurements, for example, step size 360°/a is used, a being the total number of measurements. Total number a must be greater than the number of coordinates n contained by catch containers $2_1$ through $2_{10}$, respectively. In the exemplary embodiment shown, therefore, at least ten measurements must be carried out at different angles of rotation, respectively.

By the plurality of measurements, a system of equations composed of a×n equations is obtained. Since, in the exemplary embodiment, a must include at least 10 measurements, at least 100 equations are available in the exemplary embodiment. The resolution of this extensive system of equations enables the determination of the unknown variables of this system of equations, namely partial spray quantities $A(x_i, y_j)$ at the location of measuring coordinate $(x_i, y_j)$, respectively. If the number of measurements a is selected to be greater than the number of catch containers $2_1$ through $2_{10}$, a redundancy follows that is useful for measuring accuracy. By increasing the number of measurements a, the resolution can be increased, as well, since each catch container $2_1$ through $2_{10}$ can then be allocated further measuring coordinates that can be used arithmetically as further points of reference of the distribution of the spray quantities within catch containers $2_1$ through $2_{10}$.

When working with the method according to the present invention, a calibration of the sensors connected to individual catch containers $2_1$ through $2_{10}$ is not necessary. Then, however, depending on the number of used sensors, additional measurements at further additional angles of rotation are required. In this context, in each individual measurement, again, spray quantity $A_j$ of the appertaining catch container $2_j$ detected by the sensors is ascertained according to the following equation:

$$A_j = \sum_{i=1}^{n} g_j \cdot A(x_i, y_j) \, j = 1 \ldots n \qquad (2)$$

Factor $g_j$, which, in contrast with equation (1), appears in equation (2), represents a weighting factor for the corresponding sensor. Weighting factors $g_j$ are initially unknown and represent further n unknowns of the system of equations. Therefore, n additional measurements are required. If the angular distribution to be measured is normalized using an appropriate normalization, one of the additional measurements is omitted so that only n−1 additional measurements are required. For numerical evaluation, it is advantageous for the system of equations to be linearized. This can be carried out, for example, by a Taylor expansion, the product terms being approximated by an approximation of first order and truncated after the first linear term of the Taylor expansion. Since the sensors were generally manufactured in the same manner, the variations occurring between the individual sensors in practice are relatively small so that a linear approximation is sufficient in practice.

Weighting factors $g_j$ must be ascertained only once as described and can then be stored as fixed values. The same applies to the coefficients for transforming the measuring values measured in a rotated coordinate system into an unrotated coordinate system, provided that equal angles of rotation are used in every series of measurements. In this manner, considerable computing capacity is saved in the numeric evaluation.

Figure 3:
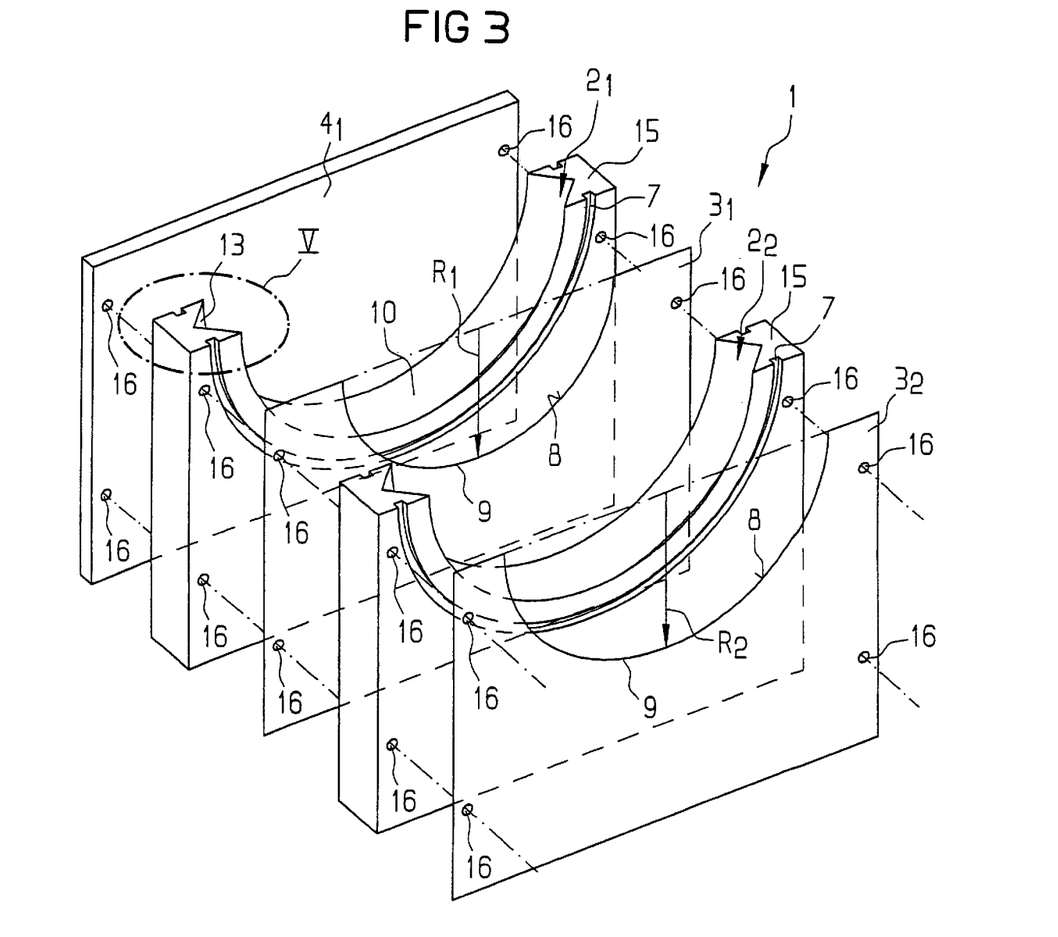
FIG. 3 shows a perspective view of a second exemplary embodiment of a measuring device according to the present invention.
Figure 4:
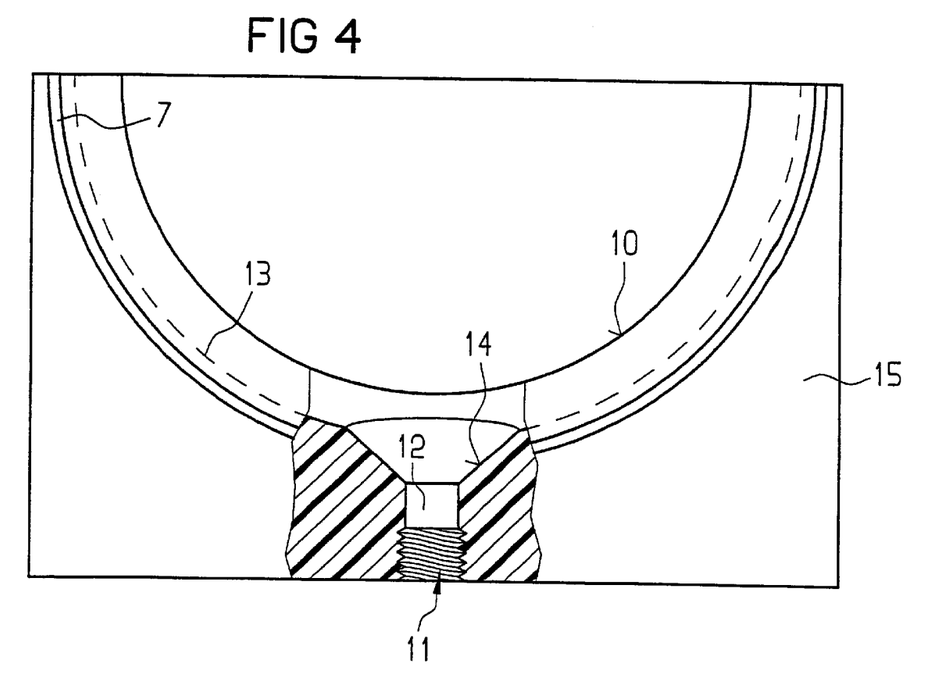
FIG. 4 shows a lateral view of an intermediate piece of the measuring device shown in FIG. 3.
Figure 5:
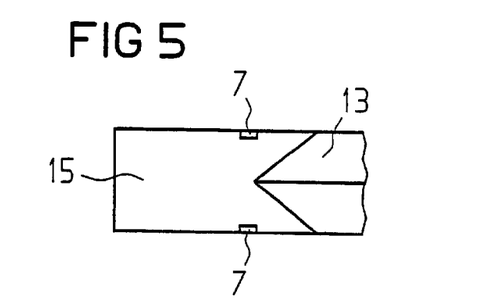
FIG. 5 shows a detail of the intermediate piece of the measuring device shown in FIGS. 3 and 4.

FIGS. 3 through 5 show a second exemplary embodiment of the measuring device 1 according to the present invention. An essential difference to the first exemplary embodiment described on the basis of FIGS. 1 and 2 is that measuring coordinates $(x_i, y_j)$ are not arranged in a plane but distributed over a spherical surface or a partial spherical surface. The advantage over a plane arrangement of measuring coordinates $(x_i, y_j)$ is that the angular distribution can be measured with a relatively high accuracy for large spray angles, i.e., for spray angles having a large inclination with respect to the z-direction in FIG. 1, as well. When working with the arrangement shown in FIGS. 1 and 2, for large spray angles, the problem exists that the impinging point on the plane of measuring coordinates $(x_i, y_j)$, i.e., on the surface of measuring device 1, takes place at a great distance from the vertical projection of spray element 5. First of all, this calls for a relatively large surface of measuring device 1, which is unfavorable for practical measurement set-up. Because of the long flight path of the ejected liquid until the surface of measuring device 1 is reached, the measurement, due to gravitation and a deceleration by the interaction with the ambient air, is corrupted because of a curvature of the flight path. These disadvantages are overcome when working with the exemplary embodiment shown in FIGS. 3 through 5, since the measuring coordinates, which are arranged on a hemisphere in this exemplary embodiment, each have the same distance from the spray point of spray element 5.

Measuring device 1 partially shown in FIG. 3 in a perspective view is essentially composed of dividing walls $3_1, 3_2$, which are spaced from each other and from outer wall $4_1$, as well as from outer wall $4_2$, which is not shown, by intermediate pieces 15. For reasons of simplification, only two dividing walls $3_1, 3_2$ and two intermediate pieces 15 are shown in FIG. 3. In the exemplary embodiment, outer wall $4_1$, intermediate pieces 15, and dividing walls $3_1$ and $3_2$ have concentric bores 16. Outer wall $4_1$, intermediate pieces 15, and dividing walls $3_1, 3_2$, as well as the further dividing walls, intermediate pieces, and opposite outer wall $4_2$, which are not visible in the Figure, can be interconnected by screws or pins, which can be inserted into bores 16, in such a manner that dividing walls $3_1, 3_2$ and outer walls $4_1, 4_2$ each fit closely on neighboring intermediate pieces 15. Used for sealing, in each case, is a groove 7 on intermediate pieces 15, it being possible to insert, for example, a rubber lip or another sealing means into the groove.

It is essential that dividing walls $3_1, 3_2$ each have a partially circular cutout 8. In each case in the exemplary embodiment, the radius of the semicircular cutouts 8 decreases, starting from the middle of measuring device 1, in a direction toward the two outer walls $4_1$ and $4_2$, respectively, dividing walls $3_1, 3_2$ in each case having a smaller radius $R_1, R_2$ of their cutout 8 in a direction toward outer walls $4_1, 4_2$. In this context, radii $R_1, R_2$ are selected such that, in the assembled condition of measuring device 1, edges 9 lie on a partial sphere, in the exemplary embodiment on a hemisphere. In this context, spray element 5 is arranged in such a manner that its spray point coincides with the center point of the partial sphere. Cutouts 8 of diaphragm-like dividing walls $3_1, 3_2$ define the geometric position of the measuring coordinates.

FIG. 4 shows a partially cross-sectional lateral view of an intermediate piece. As is visible in FIGS. 3 and 4, intermediate piece 15 each have an opening 10, which, in the exemplary embodiment is rounded off, as well. However, the shape of opening 10 has no influence on the geometric position of the measuring coordinates. The rounding-off of opening 10 simply serves for rapidly conveying the partial spray quantity of the liquid jet collected by catch containers $2_1, 2_2$ to a sensor (not shown) connected to a connection 11. In the exemplary embodiment shown, connection 11 is formed in a bore 12 at the bottom side of intermediate pieces 15. The top side of intermediate pieces 15 in each case has a, in the exemplary embodiment, V-shaped groove 13 that is connected to bore 12 of sensor connection 11 via a funnel-shaped enlargement 14 formed at the bottom of groove 13. Enlargement 14 is used to make it easier for the liquid to flow off in a direction toward sensor connection 11. The design of groove 13 is also visible in FIG. 5, which shows a top view of detail V in FIG. 3. Each groove 13 of intermediate pieces 15 constitutes a catch container 2 for collecting partial spray quantities $A(x_i, y_j)$ to be caught.

Also when measuring with the measuring device shown in FIGS. 3 through 5, a plurality of individual measurements are carried out, in each case, with different angles of rotation in the same manner as already described on the basis of FIGS. 1 and 2. Alternatively, a continuous measurement can be carried out, with measuring device 1 continually rotating slowly and continual measurement by the sensors. A disturbing afterflow delay of the liquid can be eliminated by rotating the measuring device in both directions of rotation.

Figure 6:
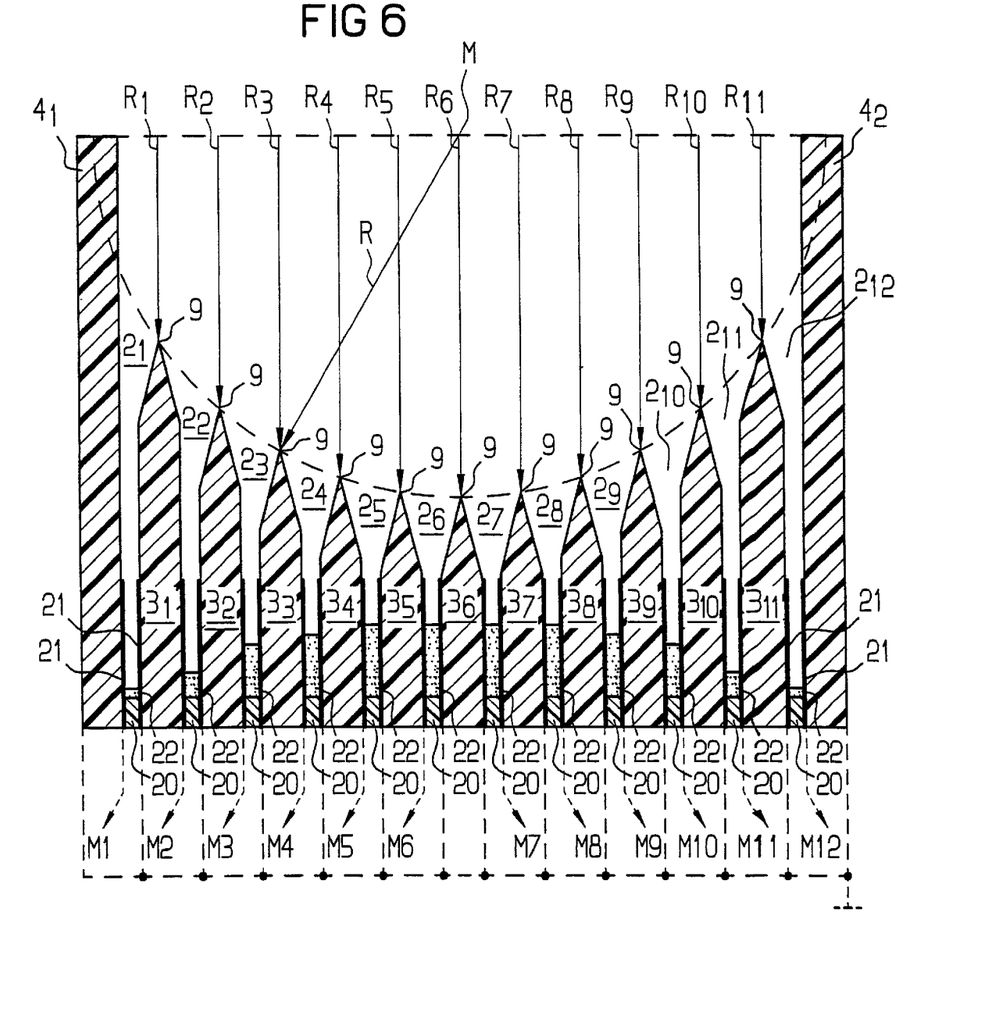
FIG. 6 shows a cross-sectional lateral view of a third exemplary embodiment of a measuring device according to the present invention.
Figure 7:
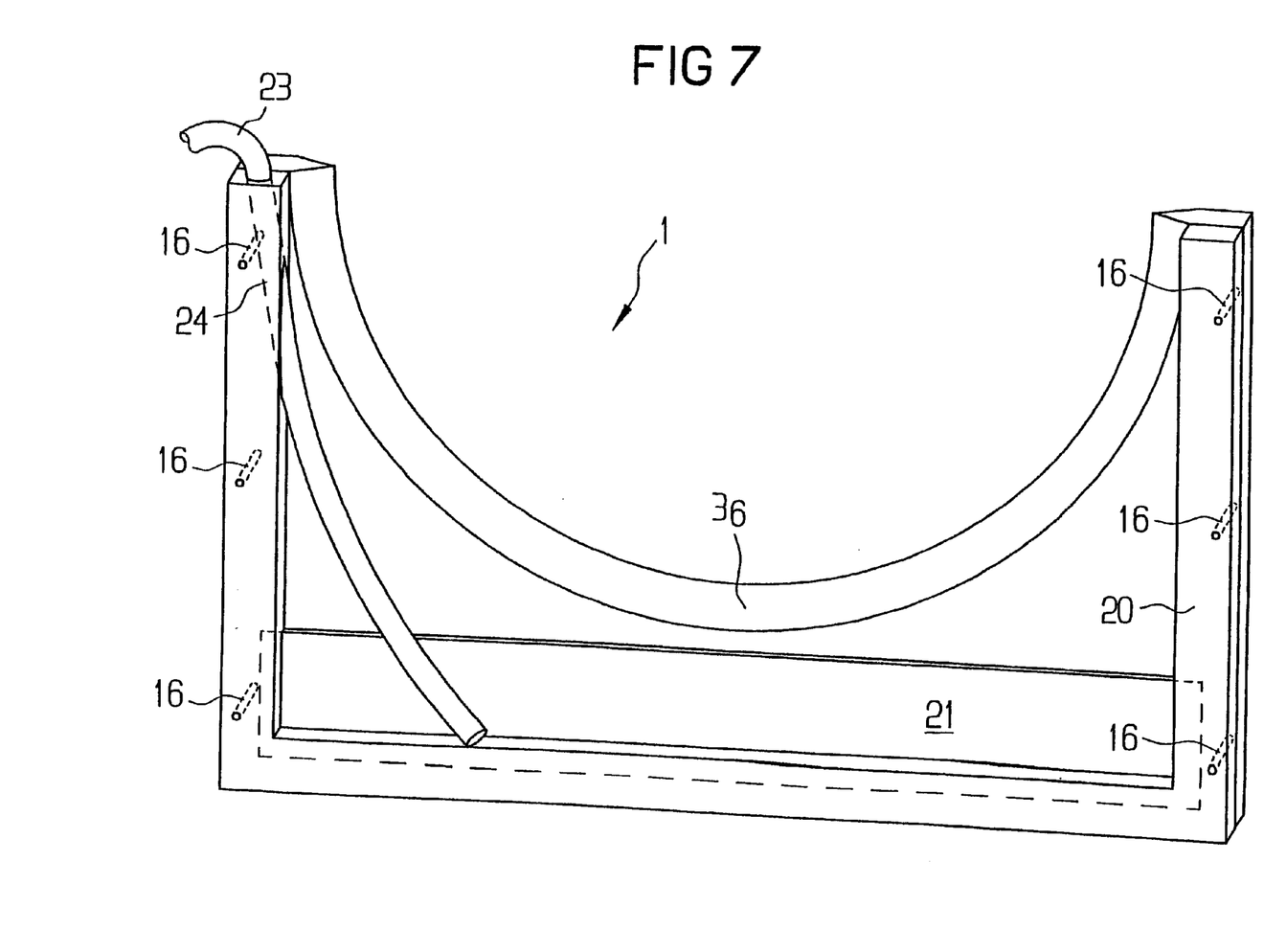
FIG. 7 shows a perspective view of a segment of the measuring device shown in FIG. 6.

FIGS. 6 and 7 show a third exemplary embodiment of measuring device 1 according to the present invention, FIG. 6 showing a cross-section transverse to dividing walls $3_1$ through $3_{11}$, and FIG. 7 showing a perspective representation of an individual dividing wall $3_6$.

In contrast to the exemplary embodiment shown in FIGS. 3 through 5, in the exemplary embodiment shown in FIGS. 6 and 7, dividing walls $3_1$ through $3_{11}$ are formed of a relatively thick, electrically insulating material and pointed at edges 9 in a roof-like manner. In this exemplary embodiment, radii $R_1$ through $R_{11}$ of partially circular cutouts 8 are dimensioned such that edges 9 of cutouts 8 lie on a hemisphere having radius R about center point M. Located at center point M is the spray point of spray element 5, for example, the spray orifice of a fuel injector.

Dividing walls $3_1$ through $3_{11}$ are spaced from each other by electrically insulating spacers 20 and provided with electrodes 21 on both sides. The inner sides of outer walls $4_1$ and $4_2$ are provided with electrodes 21, as well. Electrodes 21 can be applied to electrically insulating dividing walls $3_1$ through $3_{11}$ and outer walls $4_1$ and $4_2$ by, for example, vapor deposition or other coating processes, the dividing walls and outer walls being made, for example, from a plastic material. Therefore, in each case two electrodes 21 are opposed to each other at catch containers $2_1$ through $2_{12}$ formed between dividing walls $3_1$ through $3_{11}$ and between outer wall $4_1$ and first dividing wall $3_1$ and between outer wall $4_2$ and last dividing wall $3_{11}$ respectively. One of electrodes 21 is connected to the zero potential of an electric circuit while, in each case, the other electrode 21 is connected to a capacitance-measuring circuit working, for example, as bridge circuit, via a connection $M_1$ through $M_{12}$. Therefore, the level of non-conducting liquid 22 collected by catch containers $2_1$ through $2_{12}$ can be measured capacitively in a particularly simple manner. Electrically conductive liquid volumes can also be measured capacitively by providing metallic electrodes 21 with a homogenous, thin insulating coating. The capacitive measurement of the level is based on that the collected liquid has different dielectric constant than the air contained in the unfilled regions between electrodes 21. In this context, a plurality of measurements can be carried out at different angles of rotation, as described, and in each case the resulting change in capacitance indicates the change in the level for the preceding measurement. Therefore, catch containers $2_1$ through $2_{12}$ need to be emptied only at the end of the series of measurements.

FIG. 7 shows a perspective representation of a dividing wall $3_6$ and of spacer 20. Visible are bores 16 for connecting individual spacers 20 and dividing walls $3_1$ through $3_{11}$ as well as outer walls $4_1$ and $4_2$. Further visible is electrode 21 which is led under spacer 20 in the edge area to prevent edge effects during the measurement of the level. Catch containers $2_1$ through $2_{12}$ are emptied, for example, by a hose 23 and an suitable suction device. In the exemplary embodiment, the upper end of U-shaped spacer 20 is provided with a bore 24 for fastening hose 23, the hose being passed through bore 24.

The width of catch containers $2_1$ through $2_{12}$ can be adapted to the partial spray quantity to be expected. In this context, the collecting width between two dividing walls $3_1$ through $3_{11}$ can be selected to be greater in those regions where a low partial spray quantity is expected, for example, at catch containers $2_1$ and $2_{12}$ located outward, while the distance between electrodes 21 remains the same. The collecting width can be varied by varying the wall thickness of dividing walls $3_1$ through $3_{11}$. Conversely, it is also possible to increase the local resolution by using narrower collecting widths in the central region of measuring device 1.

Edges 9 of dividing walls $3_1$ through $3_{11}$ do not necessarily have to lie on a hemisphere, but can also describe a calotte forming an angle of more than 180°. Then, the angular distribution of the ejected liquid jet can also be measured in an angular range exceeding an opening angle of 180°, i.e. exceeding a deviation of 90° with respect to the vertical. Measurements of that kind are never possible using measuring devices 1 having a plane measuring surface. Between the points of reference defined by the individual measuring coordinates and the partial spray quantities detected there, an interpolation can be carried out.

What is claimed is:

1. A method for measuring an angular distribution of a liquid jet ejected from a spray element, comprising the steps of:
   detecting by a measurement a plurality of partial spray quantities at a plurality of measuring coordinates;
   performing the measurement in a multiply repeating manner using a plurality of catch containers, the catch containers containing the measuring coordinates, the measuring coordinates being arranged in one of a spatially distributed manner and a planarly distributed manner; and
   rotating the catch containers about an axis of rotation with different angles of rotation.

2. The method according to claim 1, wherein:
   the liquid jet is a fuel jet; and
   the spray element is a fuel injector.

3. The method according to claim 1, wherein:
   the catch containers contain less than n+1 measuring coordinates;
   the measurement is performed at least n times; and
   n is an integer greater than 1.

4. The method according to claim 1, further comprising the steps of:
   using a plurality of sensors to measure the partial spray quantities, each of the sensors being allocated to one of the catch containers without being calibrated with respect to the other sensors;
   weighting each of the partial spray quantities with a respective weighting factor for calibration, the partial spray quantities being collected by the catch containers and measured by the sensors; and
   repeating a second measurement for determining the respective weighting factor, the second measurement being repeated at least an amount corresponding to the number of sensors at different angles of rotation.

5. The method according to claim 1, wherein:
   the catch containers are strip-shaped and contain the measuring coordinates offset from each other in a first coordinate direction, the catch containers being arranged in an offset manner from each other in a second coordinate direction; and
   the axis of rotation is arranged parallel to a third coordinate direction.

6. The method according to claim 5, further comprising the steps of:
   performing the first measurement is performed at least n times at a different angle of rotation each time;
   determining the total of the partial spray quantities collected by each of the catch containers during each first measurement at a different angle of rotation;
   transforming a coordinate system of the measuring coordinates into an unrotated coordinate system for each angle of rotation of a measurement; and
   solving a system of equations composed of at least n×m equations, each of the equations including n×m unknown partial spray quantities at each of the measuring coordinates of the catch containers,
   wherein:
   there are m catch containers;
   each of the catch containers contain n measuring coordinates; and
   n and m are integers greater than 1.

7. A device for measuring an angular distribution of a liquid jet ejected from a spray element, comprising:
   a plurality of catch containers arranged rotatably about an axis of rotation, the catch containers detecting partial spray quantities at a plurality of measuring coordinates arranged in one of a spatially distributed manner and a planarly distributed manner, each of the catch containers containing at least two of the measuring coordinates; and
   a plurality of sensors, each of the sensors being allocated to one of the catch containers and detecting a partial spray quantity collected by the one of the catch containers.

8. The device according to claim 7, wherein:
   the liquid jet is a fuel jet; and
   the spray element is a fuel injector.

9. The device according to claim 7, wherein:
   the catch containers are strip-shaped and extend along a longitudinal extension; and
   at least two of the catch containers are arranged side by side and offset from one another transversely to the longitudinal extension.

10. The device according to claim 9, further comprising:

a plurality of dividing walls, each of the dividing walls separating one of the catch containers from another of the catch containers, the dividing walls having partially circular cutouts, radii of the partially circular cutouts decreasing from a middle catch container toward outer catch containers, edges of the partially circular cutouts laying on a common spherical surface.

11. The device according to claim 10, wherein:

each of the dividing walls is spaced from another of the dividing walls by an intermediate piece, the intermediate piece having an opening larger than the partial circular cutout of the corresponding dividing walls, the intermediate piece having a collecting groove for collecting a partial spray quantity of the liquid jet, the groove leading to a connection for the corresponding sensor.

12. The device according to claim 10, further comprising:

a plurality of electrodes arranged on outer walls of the outer catch containers and the dividing walls, the electrodes capacitively measuring the level of collected liquid.

13. The device according to claim 10, wherein:

the distance between the dividing walls at the partial circular cutouts increases from the middle catch container toward the outer catch containers.

* * * * *